Figure 1:
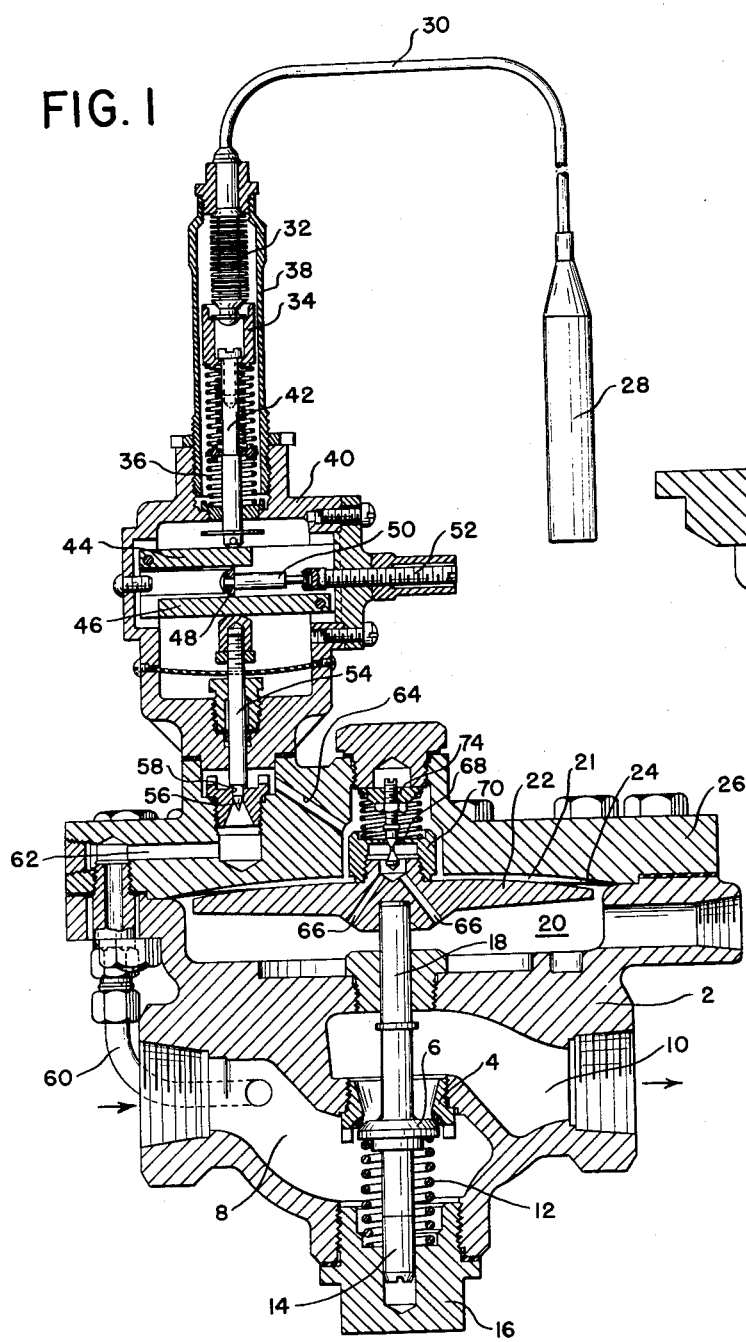

Dec. 15, 1959

S. SODERBERG ET AL 2,917,268

PILOT CONTROL REGULATOR

Filed April 1, 1957

INVENTORS
STEN SODERBERG
SIGGE SCHILLER
BY
Pennie, Edmonds, Morton, Barrows & Taylor
ATTORNEYS United States Patent Office 2,917,268
Patented Dec. 15, 1959

2,917,268
PILOT CONTROL REGULATOR

Sten Soderberg, Nutley, and Sigge Schiller, Rutherford, N.J., assignors to Leslie Co., Lyndhurst, N.J., a corporation of New Jersey Application April 1, 1957, Serial No. 649,856

3 Claims. (Cl. 251—35)

This invention relates to temperature regulators, and more particularly to a temperature regulator with an adjustable, proportional band.

The conventional steam pilot, piston or diaphragm operated, temperature regulator has a fixed, quite narrow proportional band. By "proportional band" is meant the variation in the controlled temperature required to open or close the regulator fully. In most temperature control applications there is a process lag, and this causes regulator to over and under ride, which results in "on-off" action and bad cycling.

In the present invention we provide means for the adjustment of the proportional band. Thus, if we assume that a movement of .010″ of the pilot stem, which controls the flow of steam from the inlet side of the valve to a diaphragm chamber which operates the main valve, is necessary to open or close the main valve fully and the thermostat stem is moved .002″ for every degree Fahrenheit variation, a total of 5° Fahrenheit variation would be necessary to fully open or close the valve if the pilot stem and the thermostat stem are directly connected or connected in a 1 to 1 lever ratio. By arranging a suitable lever connection between the thermostat stem and the pilot stem, the lever ratio may be adjusted to require more movement of the thermostat stem, and thus a greater change in temperature, to fully open or close the valve. Thus, by use of a 5 to 1 ratio, the temperature change required in the above example is increased to 25° F.

The provision of such leverage, however, does not completely solve the problem. The conventional type of steam pilot operated regulator is provided with a fixed orifice for bleeding steam from the steam pressure loaded side of the diaphragm or piston to the outlet side of the regulator. Since the pressure drop across the piston or diaphragm which is required to start opening the valve does not have to increase appreciably to open the valve fully, the variable lever ratio arrangement by itself would not provide the proper proportional action. It would only create more or less of a dead spot from closed valve until the valve actually starts to open after which it will continue to open for very little additional drop in the controlled temperature.

We accordingly provide a valve for the bleed orifice of the diaphragm chamber by means of which the orifice is restricted when the main valve is closed, but the rate of bleed increases as the valve opens to a point where it equals the rate of supply. When the main valve is closed, the bleed valve permits a minimum discharge through the bleed orifice. Thus a very slight opening of the pilot valve controlled by the thermostat builds up a pressure on the diaphragm and starts to open the main valve. As the diaphragm moves to fully open the main valve, the opening of the bleed orifice and the rate of bleed increases until the diaphragm reaches a point where the rate of bleed equals the rate of supply through the pilot valve. Thus, a balance is restored and the main valve remains in such position until a further change of temperature causes movement of the pilot valve. As a result, proportional action is obtained.

As the main valve approaches a fully open position, the pressure drop across the pilot valve decreases. In a conventional construction the pressure drop across the bleed orifice remains constant. Thus, the rate of bleed with respect to the rate of supply of steam to the diaphragm increases. We overcome this defect by decreasing the rate of bleed as the main valve approaches a fully open position, and thus maintain a more constant ratio of pilot supply to bleed. We thus obtain a more constant increase in outlet pressure per degree Fahrenheit drop in controlled temperature throughout the entire load range. Also, less pressure drop is required to obtain full valve opening.

The desired result may be obtained in several different ways. A simple means for increasing the rate of bleed as the main valve opens to cause the rate of bleed to increase to a point where it equals the rate of supply is to place a cone-shaped valve stem in the bleed orifice with the cone arranged to increase the size of the opening as the diaphragm and main valve begin their movement from a closed position to an open position. Then, as the main valve approaches a fully open position and the pressure drop across the pilot valve decreases, the rate of bleed may be decreased by tapering the valve stem in the bleed orifice in a reverse direction. Thus, we employ a bleed valve having two tapered portions extending in opposite directions, with the bases of the cones arranged so that the bleed orifice is opened the least amount when the main valve is closed and as it approaches a fully opened position.

Figure 2:
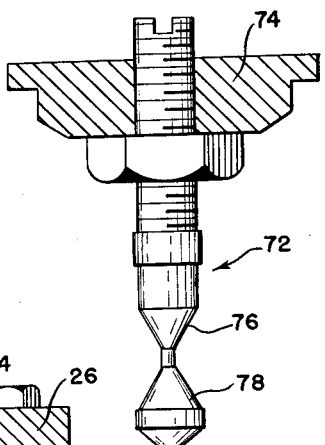
Figure 3:
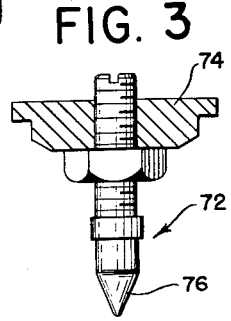

In the accompanying drawing, we have illustrated several forms of the invention. In this showing:

Fig. 1 is a vertical, sectional view;
Fig. 2 is a detailed, sectional view of the valve of the bleed orifice on an enlarged scale; and
Fig. 3 is a similar view showing a valve with a single taper.

Referring to the drawing, a valve casing 2 is provided with a valve seat 4 for the reception of main valve 6. The valve casing is provided with an inlet side 8 and a discharge or outlet side 10. As shown, valve 6 is biased toward a closed position by a spring 12 which surrounds the lower stem 14, and engages the inner side of closure plug 16. Beyond valve disc 6, valve stem 18 extends into a diaphragm casing. A head 22 is arranged on the valve stem and the head is connected to a diaphragm 24 clamped between the walls of the casing and a closure or cap 26. A lower diaphragm chamber 20 and an upper diaphragm chamber 21 are thus formed on opposite sides of diaphragm 24.

In such construction, diaphragm 24 opens the main valve 6 against the force of spring 12 when sufficient pressure is exerted on the diaphragm. This is controlled by a thermostat, the bulb 28 of which is arranged at a point remote from the valve, where the temperature is to be controlled. Bulb 28 is connected by tubing 30 to an expandible bellows 32. The bulb, tube and bellows are filled with a suitable medium, generally a liquid which expands and contracts on rise and fall of temperature. This causes the bellows 32 to expand and contract and, upon expansion, head 34, with which it is in contact, is moved downwardly, placing spring 36 under compression. These parts are mounted in a thermostat casing 38. As shown, casing 38 is cylindrical and is provided with external threads at its lower end received in a tapped opening in the member 40 on which it is mounted. Thus, by raising or lowering the casing 38, the thermostat may be adjusted to calibrate it for proper operation. Thermostat stem 42 is connected to head 34 and in constructions heretofore used, it transmits its movement directly to the stem of a pilot valve.

However, as a part of the means for permitting adjustment of the proportional band, we provide a pair of pivoted members 44 and 46 in the casing 40. A slidable contactor 48 is arranged between the pivoted members. Contactor 48 may be adjusted longitudinally of members 44 and 46. As shown, it is mounted on a rod 50, connected to a threaded member 52 which extends through a threaded opening in the side of the casing 40. The end of member 52 is notched for the reception of a screwdriver, or other suitable tool. Thus, with contactor 48 in line with the center of thermostat stem 42 and pilot valve stem 54, the lever ratio between them is 1 to 1. As the contactor is moved to the left in Fig. 1, toward the pivot of upper member 44, and the free end of lower member 46, the ratio of movement of the pilot stem 54 increases and a ratio of 5 to 1 may be obtained.

Pilot stem 54 carries a pilot valve 56 on its lower end which engages a valve seat 58. The pilot valve is connected to the inlet side of the main valve casing by tubing 60 and bored passages 62 through parts of the casing. On the outlet side of the pilot valve, a passage 64 communicates with diaphragm chamber 21 on the upper side of the diaphragm. Thus steam supplied to the upper side of the diaphragm when pilot valve 56 is opened by the thermostat moves the main valve 6 to open position placing spring 12 under compression. When pressure on upper side of diaphragm 24 falls, the spring 12 closes the main valve.

In such arrangements, the diaphragm chamber 21 is provided with a bleed orifice to bleed steam from the pressure side of the diaphragm to the outlet side of the regulator. As shown, head 22 has passages 66 leading to the lower side of the diaphragm. These passages communicate with the pressure loaded side 21 of the diaphragm through an orifice 68 in a cap 70. As stated, with an orifice of fixed size, the variable lever ratio alone does not give the desired proper proportional action. The pressure drop across the diaphragm does not have to increase appreciably to fully open main valve 6.

By restricting bleed orifice 68 when the valve 6 is closed or is just beginning to open, a more rapid build-up of pressure on the diaphragm is obtained, starting the diaphragm and main valve downwardly. As cap 70 in which the orifice is formed moves with the diaphragm, we provide a stationary valve member 72. Valve member 72 is mounted on a support 74 and is provided with reverse tapering portions 76 and 78. As shown in Fig. 1, the tapering portions 76 and 78 are arranged in the orifice 68. When the main valve is closed, orifice 68 surrounds the upper tapering portion 76 near its base, and the opening is at a minimum. Therefore, a very slight opening of pilot valve 56 begins to build up pressure on the diaphragm and starts opening main valve 6. As the valve 6 and diaphragm move, the opening increases until a point is reached where the rate of bleed through the orifice equals the rate of supply through pilot valve 56. This balance will retain valve 6 in a position until pilot valve either opens further or closes, depending upon a fall or rise in temperature.

The lower reverse taper is to compensate for the condition which occurs as the main valve 6 approaches fully opened position. At that time, the pressure drop across the pilot valve 56 decreases whereas, with a fixed orifice, the rate of bleed remains the same. Therefore, there is an increase in the rate of bleed in relation to rate of supply of steam to the diaphragm which reduces the amount of increase in outlet pressure per degree drop in temperature. By providing the reverse taper 78, the above condition is avoided. As the main valve 6 approaches maximum open position, the bleed orifice is decreased. In this manner, the rate of bleed to rate of supply is held more constant. The result is a more constant increase in outlet pressure per degree drop in temperature throughout the full load range.

Thus, by increasing or decreasing the bleed opening, we are able to obtain a more accurate performance, and at the same time increase the proportional band. Parts of the control herein shown, with the exception of the reverse taper valve or similar means for controlling the size of the bleed orifice, are by way of illustration and other equivalent means may be employed in place of the elements shown. Thus, it is conventional to use a piston and cylinder in place of the diaphragm and diaphragm casing and it is to be understood that such substitution of equivalent parts is within the scope of the invention, as described and hereinafter claimed.

Where small pressure drop through the regulator is not important, we may dispense with the reverse taper 78 of the bleed valve and employ a valve having merely the one taper 76 as shown in Fig. 3. As previously described, this construction restricts the bleed orifice when the valve is closed or just beginning to open, and increases it as the valve opens until a point is reached where the rate of bleed through the orifice equals the rate of supply through pilot valve 56.

We claim:

1. Control mechanism comprising a valve casing having an inlet side and an outlet side, a main valve in the casing which controls the flow of fluid from the inlet side to the outlet side, a pilot valve connected to the inlet side of the main valve casing, a pressure chamber arranged adjacent the main valve and connected to the pilot valve, means to actuate the pilot valve, control means in the pressure chamber operatively connected to the main valve, the control means including a member having a bleed orifice to permit flow of fluid from one side of said member to the other, and a valve arranged in said orifice, said valve and said control member being relatively movable, the valve comprising a pair of sections of progressively increasing cross-section with their smaller ends adjacent each other, and being arranged with said sections at opposite ends of the orifice so that when the pressure on the side of the pressure chamber that is connected to the pilot valve is at a minimum the bleed orifice is restricted, and is progressively opened as the pressure builds up until the rate of bleed substantially equals the rate of supply and is then restricted as the main valve approaches a fully open position.

2. Apparatus in accordance with claim 1 in which the progressively increasing cross-section of each section comprises a tapered portion.

3. Apparatus in accordance with claim 1 in which the control means comprises a diaphragm, the bleed orifice is formed in a member carried by and movable with the diaphragm, and the valve comprises a stem extending through the bleed orifice.

References Cited in the file of this patent

UNITED STATES PATENTS

| | | |
|---|---|---|
| 857,073 | Kemmler | June 18, 1907 |
| 1,177,463 | Wagner | Mar. 28, 1916 |
| 1,943,831 | Mansure | Jan. 16, 1934 |
| 2,040,109 | Spence | May 12, 1936 |
| 2,264,261 | Erbguth | Nov. 25, 1941 |